(12) United States Patent
Mizutani et al.

(10) Patent No.: US 7,771,876 B2
(45) Date of Patent: Aug. 10, 2010

(54) ANODE ACTIVE MATERIAL METHOD OF MANUFACTURING THE SAME AND NONAQUEOUS ELECTROLYTE SECONDARY BATTERY USING THE SAME

(75) Inventors: Satoshi Mizutani, Tokyo (JP); Hiroshi Inoue, Fukushima (JP)

(73) Assignee: Sony Corporation, Tokyo (JP)

( * ) Notice: Subject to any disclaimer, the term of this patent is extended or adjusted under 35 U.S.C. 154(b) by 1224 days.

(21) Appl. No.: 10/519,898

(22) PCT Filed: May 7, 2004

(86) PCT No.: PCT/JP2004/006473

§ 371 (c)(1),
(2), (4) Date: Dec. 22, 2004

(87) PCT Pub. No.: WO2004/100293

PCT Pub. Date: Nov. 18, 2004

(65) Prior Publication Data

US 2005/0208378 A1    Sep. 22, 2005

(30) Foreign Application Priority Data

May 9, 2003    (JP) ............................. 2003-131234

(51) Int. Cl.
*H01M 4/40*    (2006.01)
*H01M 4/58*    (2006.01)
(52) U.S. Cl. .............................. 429/231.95; 429/231.9; 429/231.1; 252/182.1
(58) Field of Classification Search ............ 429/231.95, 429/231.9, 231.1; 252/182.1
See application file for complete search history.

(56) References Cited

U.S. PATENT DOCUMENTS 4,950,566 A        8/1990   Huggins et al.
6,949,312 B1 *   9/2005   Kawakami et al. ........ 429/218.1

FOREIGN PATENT DOCUMENTS

| JP | 08-315825 | 11/1996 |
| JP | 11-102699 | 4/1999 |
| JP | 2000-173669 | 6/2000 |
| JP | 2000-173670 | 6/2000 |
| JP | 2000-311681 | 11/2000 |
| JP | 2001-068096 | 3/2001 |
| WO | WO 2004/100293 A1 | 11/2004 |

* cited by examiner

*Primary Examiner*—Dah-Wei Yuan
*Assistant Examiner*—Angela J. Martin
(74) *Attorney, Agent, or Firm*—K&L Gates LLP

(57)    ABSTRACT

An anode active material having a high discharge capacity and a superior capacity retention ratio during a charge-discharge cycle is provided. The anode active material includes an alloy material including an element M capable of being alloyed with Li and at least one kind of element R selected from elements with an atomic number of 20 or less, except for H, Li and a noble gas. As the element M, for example, Sn and at least one kind, such as, of Ni, Cu, Fe, Co, Mn, Zn, In and Ag are included. As the element R, B, C, Al, Si, P, S or the like is included. The anode active material can have a low-crystalline or amorphous structure by the element R, thereby Li can be smoothly inserted and extracted. The content of the element R is preferably within a range from about 10 wt % to about 50 wt %.

8 Claims, 1 Drawing Sheet

ANODE ACTIVE MATERIAL METHOD OF MANUFACTURING THE SAME AND NONAQUEOUS ELECTROLYTE SECONDARY BATTERY USING THE SAME

CROSS REFERENCES TO RELATED APPLICATIONS

The present application claims priority to Japanese Patent Document No. 2003-131234 filed on May 9, 2003, the disclosure of which is herein incorporated by reference.

BACKGROUND OF THE INVENTION

The present invention relates to an anode active material comprising, for example, an alloy material (including an intermetallic compound) capable of electrochemically reacting with lithium (Li), and more specifically relates to an improvement in cycle characteristics of the anode active material. Moreover, the present invention relates to a method of manufacturing the anode active material and a nonaqueous electrolyte secondary battery using the anode active material.

In recent years, a large number of portable electronic devices such as camcorders, cellular phones and laptop computers have been emerged, and the size and the weight of them have been reduced. Research and development aimed at improving the energy densities of batteries used as power sources of the electronic devices, specifically secondary batteries as a key device have been actively promoted. Among the batteries, a nonaqueous electrolyte secondary battery (for example, a lithium-ion secondary battery) can obtain a high energy density, compared to a conventional aqueous electrolyte secondary battery such as a lead-acid battery and a nickel cadmium battery, so the improvement of the battery has been studied in all quarters.

As an anode material used in the lithium-ion secondary battery, a carbon material having a relatively high capacity and superior cycle characteristics such as non-graphitizable carbon or graphite is broadly used. However, in consideration of a recent demand for a higher capacity, a further increase in the capacity of the carbon material presents a challenge.

In such a background, a technique of achieving a carbon material with a high capacity through selecting a material to be carbonized and forming conditions has been developed (for example, refer to Japanese Unexamined Patent Application Publication No. Hei 8-315825). However, when such a carbon material is used as an anode material, an anode has a discharge potential vs. lithium of 0.8 V to 1.0 V, and when a battery includes the carbon material, the discharge voltage of the battery is reduced, so a significant improvement in the energy density of the battery cannot be expected. Moreover, there is a disadvantage that the hysteresis in the shape of a charge-discharge curve is large, thereby energy efficiency in each charge-discharge cycle is low.

On the other hand, as an anode with a higher capacity than the carbon material, an alloy material which is formed through electrochemically alloying some kind of metal with lithium and is reversibly produced and decomposed has been researched. For example, an anode with a high capacity using a Li—Al alloy has been developed, and an anode with a high capacity including a Si alloy has been developed (for example, refer to U.S. Pat. No. 4,950,566).

However, the Li—Al alloy or the Si alloy has a big problem that the cycle characteristics are extremely poor, because the alloy expands or shrinks according to charge and discharge, so every time a charge-discharge cycle is repeated, the anode is pulverized.

Therefore, in order to improve the cycle characteristics, a technique of coating the surface of an alloy material with a material with high conductivity has been considered (for example, refer to Japanese Unexamined Patent Application Publication Nos. 2000-173669, 2000-173670 and 2001-68096). In techniques described in the above patent literatures, the surface of the alloy is coated with a conductive material through a technique of immersing the alloy material in an organic solvent in which a conductive material is dissolved, or a technique of using a mechanochemical reaction such as hybridization, thereby the cycle characteristics are improved.

However, even in the case where these techniques are used, an effect of improving the cycle characteristics are not sufficient, so the fact is that advantages of the anode with a high capacity including the alloy material cannot be used sufficiently.

SUMMARY OF THE INVENTION

In an embodiment, the present invention provides an anode active material having a high discharge capacity and a superior capacity retention ratio during a charge-discharge cycle, and a method of manufacturing the same. Moreover, the present invention in an embodiment provides a nonaqueous electrolyte secondary battery with a higher capacity and superior cycle characteristics, compared to, for example, a nonaqueous electrolyte secondary battery using a graphite material for an anode.

A first anode active material according to an embodiment comprises an alloy material including an element M capable of being alloyed with lithium (Li) selected from metal elements and metalloid elements and at least one kind of element R selected from elements with an atomic number of 20 or less (except for hydrogen, lithium and a noble gas), wherein the content of the element R is within a range from 10 wt % to 50 wt %.

A second anode active material according to an embodiment comprises an alloy material including tin (Sn) and at least one kind of element R selected from elements with an atomic number of 20 or less (except for hydrogen, lithium and a noble gas), wherein the content of the element R is within a range from 10 wt % to 50 wt %.

In a method of manufacturing an anode active material according to an embodiment, the anode active material comprises an alloy material which includes an element M capable of being alloyed with lithium selected from metal elements and metalloid elements and at least one kind of element R selected from elements with an atomic number of 20 or less (except for hydrogen, lithium and a noble gas), and the method comprises using a material including the element M and a material including the element R to synthesize the anode active material by a mechanical alloying method.

A first nonaqueous electrolyte secondary battery according to an embodiment comprises: a cathode; an anode; and a nonaqueous electrolyte, wherein the anode includes an alloy material including an element M capable of being alloyed with lithium selected from metal elements and metalloid elements and at least one kind of element R selected from elements with an atomic number of 20 or less (except for hydrogen, lithium and a noble gas), and the content of the element R in the alloy material is within a range of 10 wt % to 50 wt %.

A second nonaqueous electrolyte secondary battery according to an embodiment comprises: a cathode; an anode; and a nonaqueous electrolyte, wherein the anode includes an alloy material including tin and at least one kind of element R selected from elements with an atomic number of 20 or less (except for hydrogen, lithium and a noble gas), and the content of the element R in the alloy material is within a range of 10 wt % to 50 wt %.

In the first and the second anode active materials according to an embodiment, the content of the element R is 10 wt % or more, so the crystallinity can be low or amorphous, and lithium can be smoothly inserted or extracted to improve charge-discharge efficiency and cycle characteristics. Moreover, the content of the element R is 50 wt % or less, so a higher capacity can be obtained.

In the method of manufacturing an anode active material according to an embodiment, the anode active material is synthesized through the use of a material including the element M and a material including the element R by a mechanical alloying method, so the first or the second anode active material according to the invention can be easily manufactured.

In the first or the second nonaqueous electrolyte secondary battery according to an embodiment, the first or the second anode active material is used, so a higher capacity can be obtained and charge-discharge efficiency and cycle characteristics can be improved.

Additional features and advantages of the present invention are described in, and will be apparent from, the following Detailed Description of the Invention and the figures.

DETAILED DESCRIPTION OF THE INVENTION

Figure 1:
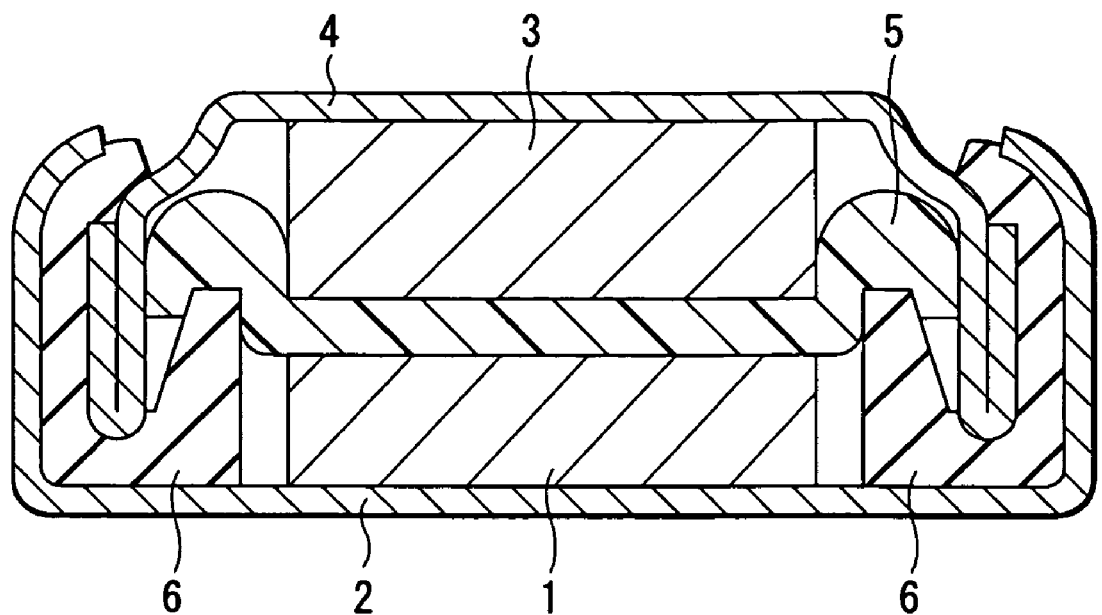
FIG. 1 is a sectional view of a coin-type battery manufactured in examples.

The present invention relates to an anode active material comprising, for example, an alloy material (including an intermetallic compound) capable of electrochemically reacting with lithium (Li), and more specifically relates to an improvement in cycle characteristics of the anode active material. Moreover, the present invention relates to a method of manufacturing the anode active material and a nonaqueous electrolyte secondary battery using the anode active material.

Preferred embodiments of the invention will be described in detail below referring to the accompanying drawings.

An anode active material according to an embodiment of the invention is an alloy material including an element M capable of being alloyed with lithium selected from metal elements and metalloid elements and at least one kind of element R selected from elements with an atomic number of 20 or less (except for hydrogen, lithium and a noble gas). In the combination of the element M and the element R, the element M and the element R are not the same. A feature of the alloy material is that the alloy material includes the element R to have a low-crystalline or amorphous structure. Thereby, it is considered that lithium is smoothly inserted and extracted, and improvements in charge-discharge efficiency and the cycle life are achieved.

More specifically, as the element R, as described above, any of elements with an atomic number of 20 or less except for hydrogen, lithium and a noble gas is used, but boron (B), carbon (C), aluminum (Al), silicon (Si), phosphorus (P), sulfur (S) or the like is preferably used. The ratio of the element R in the alloy material is preferably about 50% or less in a weight ratio. When the ratio of the element R which is inactive to lithium is larger than the above range, the alloy material may not obtain a higher capacity than a conventional material. On the other hand, when the ratio of the element R is too small, the alloy material cannot obtain a sufficient low-crystalline or amorphous structure. The ratio of the element R is more preferably within a range of about 10 wt % to about 30 wt %.

The element M preferably includes, for example, at least one kind selected from elements in Groups 11 to 15, and more specifically, the element M preferably includes silicon, tin (Sn) or both. Moreover, when the element M includes only tin and silicon, the alloy material cannot obtain sufficient cycle characteristics, so at least one kind, such as, nickel (Ni), copper (Cu), iron (Fe), cobalt (Co), manganese (Mn), zinc (Zn), indium (In) and silver (Ag) is included in the element M, and a mixture or a compound including them and tin (or silicon) is preferable. Further, for the purpose of low crystallization, one or more kinds of elements in Groups 11 to 15 except for the above-described elements may be included.

Examples of such an alloy material include 20Fe-75Sn-5B, 30Co-60Sn-10C, 35Cu-50Sn-15P, 30Zn-50Sn-20Al (values show the ratio of each element in a weight ratio) and the like.

As the anode active material, an alloy material with such a composition in a powder or fine particle form is used. The specific surface area of the anode active material is preferably within a range of about 1.0 $m^2/g$ to about 70 $m^2/g$. When the specific surface area is smaller than about 1.0 $m^2/g$, contact with an electrolyte solution or the like is insufficient, so it is difficult to secure a high capacity. On the other hand, when the specific surface area is larger than about 70 $m^2/g$, the capacity retention ratio declines, thereby the cycle characteristics declines. The specific surface area is measured by the BET (Brunauer Emmett Teller) method with, for example, an analyzer HM MODEL-1208 (product name) of Mountech.

Moreover, the alloy material as the anode active material includes a reactive phase capable of reacting with lithium or the like. When the crystallinity of the reactive phase is too high, the capacity retention ratio declines. In the invention, as an indicator of the crystallinity of the reactive phase, the half-width of a diffraction peak obtained by X-ray diffraction analysis using CuKα radiation as a specified X-ray at a sweep rate of 1°/min with, for example, a diffractometer RAD-I IC of Rigaku is used as a reference. In the measurement, the half-width of the diffraction peak corresponding to the reactive phase is preferably 0.5° or more at a diffraction angle 2θ, because when the alloy material has a low-crystalline structure having a broad peak with a half-width of about 0.5° or more or an amorphous structure having no clear peak, the capacity retention ratio can be secured and the cycle characteristics can be improved. On the other hand, when the alloy material has a half-width of less than 0.5°, thereby cannot obtain a sufficiently low-crystalline structure or an amorphous structure, the capacity retention ratio declines, and the cycle characteristics are not sufficient. More preferably, the half-width is about 10 or more, and more preferably about 5° or more.

A peak corresponding to the reactive phase capable of reacting with lithium by X-ray diffraction analysis can be easily determined through comparing between an X-ray diffraction chart before and after an electrochemical reaction with lithium. A peak changed after the electrochemical reaction with lithium is a peak corresponding to the reactive phase capable of reacting with lithium. In general, the peak of the reactive phase is shown in 2θ=30° to 60°.

As long as the anode active material satisfies the above requirements, the anode active material may be a crystalline intermetallic compound; however, the anode active material is preferably a low-crystalline compound, and more preferably an amorphous compound. While the low-crystalline compound and the amorphous compound can be determined by the half-width of a corresponding peak as an indicator in the case of the above-described reactive phase capable of reacting with lithium, the crystallinity of the anode active material can be determined through directly observing the crystal structure with a transmission electron microscope.

The above-described anode active material is used in a powder or fine particle form, and when the particle size distribution of the anode active material is small, superior characteristics can be obtained. In the particle size distribution, the median size is preferably about 50 μm or less, and more preferably from about 100 nm to about 30 μm.

As a method of manufacturing the above-described anode active material, various melting method may be used; however, in consideration of crystallinity or the like of the alloy material to be obtained, a mechanical alloying method is preferably used. As a manufacturing apparatus, any apparatus using the principle of the mechanical alloying method may be used. More specifically, a planetary ball mill, an attritor or the like can be used.

Moreover, for alloying, the simple substances of the elements may be mixed and then mechanically alloyed; however, for example, when included elements of which a part or all are alloyed are mechanically alloyed, the anode active material with superior characteristics can be obtained. Most preferably, at least a part of the elements except for the element R is alloyed beforehand, and the element R is added to the elements to be alloyed by the mechanical alloying method. The alloy as a material may have a powder or block form, and the alloy can be obtained through melting mixed materials with an electric furnace, a high-frequency induction furnace, an arc melting furnace or the like and then solidifying the materials. In order to obtain the anode active material in a powder form, the anode active material obtained by various atomization methods such as a gas atomization method and a water atomization method or various rolling methods may be pulverized to be used.

The above-described anode active material can be used for an anode of a nonaqueous electrolyte secondary battery. The nonaqueous electrolyte secondary battery comprises the anode including the anode active material, a cathode including a cathode active material and a nonaqueous electrolyte, and as the anode active material, the anode active material (alloy material) of the invention is used. In this case, in the anode, a carbonaceous material such as kinds of pyrolytic carbon, kinds of coke, kinds of glass-like carbon, a fired high molecular weight organic compound body, activated carbon or kinds of carbon black may be used as an anode active material in combination with the above alloy material. Moreover, the anode may include a material not contributing charge and discharge. In the case where the anode is formed of such a material, a known binder or the like can be used.

As the nonaqueous electrolyte, for example, either a nonaqueous electrolyte solution formed through dissolving a lithium salt in a nonaqueous solvent or a solid electrolyte including lithium salt and a gel electrolyte formed through impregnating an organic macromolecule is impregnated with the nonaqueous solvent and a lithium salt may be used.

As the nonaqueous electrolyte solution, for example, an organic solvent and a lithium salt can be used in combination as necessary. Any organic solvent which is used for a lithium secondary battery can be used, and examples of the organic solvent include propylene carbonate, ethylene carbonate, diethyl carbonate, dimethyl carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, anisole, acetate, butyrate, propionate and the like.

As the solid electrolyte, any inorganic solid electrolyte or any solid high molecular weight electrolyte which has lithium ion conductivity can be used. As the inorganic solid electrolyte, lithium nitride, lithium iodide or the like is cited. The solid high molecular weight electrolyte includes an electrolyte salt and a high molecular weight compound in which the electrolyte salt is dissolved, and as the high molecular weight compound, an ether-based macromolecule such as polyethylene oxide or a cross-link thereof, a poly(methacrylate)ester, an acrylate, a copolymer thereof, or a mixture thereof can be used.

As a matrix macromolecule of the gel electrolyte, any matrix macromolecule which can absorb the above nonaqueous electrolyte solution to be gelatinized can be used. For example, a fluoropolymer such as polyvinylidene fluoride or poly(vinylidene fluoride-co-hexafluoropropylene), an ether-based macromolecule such as polyethylene oxide or a cross-link thereof, polyacrylonitrile or the like can be used. More specifically, in terms of oxidation-reduction stability, a fluoropolymer is preferably used. In the gel electrolyte, an electrolyte salt is included in the above matrix macromolecule to obtain ion conductivity.

As the lithium salt used in each of the above electrolytes, any lithium salt used in a lithium secondary battery can be used. For example, $LiClO_4$, $LiAsF_6$, $LiPF_6$, $LiBF_4$, $LiB(C_6H_5)_4$, $CH_3SO_3Li$, $CF_3SO_3Li$, $LiCl$, $LiBr$ or the like is cited.

In the cathode, a metal oxide, a metal sulfide, a specific polymer or the like is used depending upon the kind of a target battery as the cathode active material, and the cathode can be formed through applying a mixture including the cathode active material, a known electrical conductor and a known binder to a current collector. As the cathode active material, for example, a lithium complex oxide predominantly including $Li_xMO_2$ (in the formula, M represents one or more kinds of transition metal, and the value of x depends upon a charge-discharge state of the battery, and is generally within a range of $0.05 \leq x \leq 1.10$) can be used. As the transition metal M in the lithium complex oxide, cobalt, nickel, manganese or the like is preferable. Examples of such a lithium complex oxide include $LiCoO_2$, $LiNiO_2$, $Li_xNi_yCO_{1-y}O_2$ (in the formula, the values of x and y depend upon a charge-discharge state of the battery, and is generally within a range of $0<x<1$ and $0.7<y<1.02$), a lithium-manganese complex oxide having a spinel structure and the like. The lithium complex oxides can obtain a high voltage, so the cathode active material has a superior energy density. Moreover, a metal sulfide or a metal oxide not including lithium such as $TiS_2$, $MoS_2$, $NbSe_2$ or $V_2O_5$ can be used. Further, as the cathode active material, a mixture including a plurality of kinds of the above materials may be used.

Lithium existing in a battery system is not necessarily provided from the cathode or the anode, and may be electrochemically doped into the cathode or the anode in a step of manufacturing an electrode or a battery.

The shape of the battery manufactured according to the invention is not specifically limited, so the battery can have any shape such as, for example, a cylindrical shape, a prismatic shape, a coin shape or a button shape. Further, the battery can have an arbitrary size, so the invention can be applied to, for example, a large-scale battery for electric vehicles or the like.

Specific examples of the invention will be described below on the basis of experimental results.

(Experimental Verification of the Effect of Adding the Element R)

Example 1

After materials in a powder form were dry mixed to form a mixture, approximately 400 g of corundum with a diameter of 9 mm was set in a reaction vessel of a planetary ball mill manufactured by Ito Seisakusho. The mixture ratio M:R of the element M (=copper, tin) and the element R (boron) was 8:2 (in a weight ratio), and the total amount of inputted powder was 10 g. After the measured powder was put into the reaction vessel, an argon atmosphere is substituted in the reaction vessel, and the rotation speed was set to 250 rpm. The operation cycle of a 10-minute operation and a 10-minute interval was repeated so that the total operation time reached 20 hours. After the completion of a mechanical alloying reaction, the reaction vessel was cooled down to a room temperature, and then the synthesized powder was taken out to remove coarse particles through sifting the powder through a 200-mesh sieve, thereby the anode active material (alloy material) was obtained.

Next, a test electrode was formed as below. First, 46 wt % of the above-described anode material and 46 wt % of graphite were mixed to form an active material, and then 2 wt % of an electrical conductor and 6 wt % of polyvinylidene fluoride as a binder were mixed with the active material to form a mixture. Then, the mixture was dissolved in n-methylpyrrolidone as a solvent to form slurry. The slurry was applied to a current collector made of copper foil, and was dried. The current collector was stamped into a pellet with a diameter of 15.2 mm.

As a counter electrode relative to the obtained test electrode, metal lithium stamped into a pellet with a diameter of 15.5 mm was used, and a separator was sandwiched between the test electrode and the counter electrode to form a coin-type battery. As an electrolyte solution, a mixed solvent including ethylene carbonate, propylene carbonate and dimethyl carbonate in which $LiPF_6$ as an electrolyte salt was dissolved was used.

The formed coin-type battery had a diameter of approximately 20 mm and a thickness of approximately 1.6 mm. FIG. 1 shows the structure of the formed coin-type battery. The coin-type battery was formed through laminating a cathode can 2 to which an test electrode 1 was attached and an anode can 4 to which an counter electrode 3 was attached with a separator 5 in between, and caulking their edges with an gasket 6 to seal them.

The anode active material according to the invention is generally used for an anode. However, in the above coin-type battery, metal lithium was used as the counter electrode, and the anode active material was used in the test electrode (cathode), then an electrochemical reaction with lithium was carried out to evaluate the cycle characteristics.

Examples 2 Through 8

Coin-type batteries were formed as in the case of Example 1, except that in the element M, the kind of an element combined with tin was changed.

Comparative Examples 1 Through 8

Coin-type batteries were formed as in the case of Example 1, except that an anode active material including the same element M as that in Examples 1 through 8 and not including the element R was prepared.

The cycle characteristics of the coin-type batteries were evaluated. The cycle characteristics were evaluated by a retention ratio of a capacity in the 20th cycle to a capacity in the first cycle. The results are shown in Table 1.

In all compositions of the anode materials, when the element R was added, the crystallinity of the reactive phase declined, and the half-width of a peak corresponding to the reactive phase capable of reacting with lithium by X-ray diffraction analysis was 0.5° or more. Moreover, the specific surface area was 1.0 $m^2$/g or more. It was evident from the results that the capacity retention ratio was maintained at as high a level as 80% or more. In each comparative example which included no element R, the half-width of the peak was less than 0.5°, and the capacity retention ratio was lower.

(Study on Specific Surface Area)

Next, a study on the specific surface area of the alloy material as the anode active material was carried out.

Example 9

A coin-type battery was formed as in the case of Example 1, except that the battery had the same composition as that of Example 2 and the specific surface area was 70 $m^2$/g.

Comparative Example 9

A coin-type battery was formed as in the case of Example 1, except that the battery had the same composition as that of Example 2, and the specific surface area was 80 $m^2$/g.

The results of evaluating the cycle characteristics of the coin-type batteries are shown in Table 2. In Comparative Example 9 in which the specific surface area was larger than 70 $m^2$/g, a decline in the capacity retention ratio was observed.

(Study on Element R)

Examples 10 Through 23

Coin-type batteries were formed as in the case of Example 1, except that the kind of the element R combined with the element M was changed. In Examples 10 through 14, as the element M, iron and tin were used, and in Examples 15 through 19, as the element M, cobalt and tin were used, and in Examples 20 through 23, as the element M, indium in addition to the above elements was used.

The result of evaluating the cycle characteristics of the coin-type batteries are shown in Table 3. In each example, the capacity retention ratio was maintained at a high level.

(Study on Mixture Ratio of Element M and Element R)

Examples 24 Through 29

Coin-type batteries were formed as in the case of Example 1, except that the mixture ratio of the element M and the element R was changed. The results of evaluating the cycle characteristics of the coin-type batteries are shown in Table 4. In Example 24 in which the ratio of the element R was larger than 50 wt % and Example 29 in which the ratio of the element R was less than 10 wt %, a decline in the capacity retention ratio was observed.

(Study on Half-Width)

Examples 30 Through 34

Coin-type batteries were formed as in the case of Example 1, except that the half-width of a peak corresponding to the reactive phase was variously changed. In Example 34, the anode active material was sufficiently amorphous, so the half-width cannot be measured. The results of evaluating the cycle characteristics of the coin-type batteries are shown in Table 5. As the half-width increased, the capacity retention ratio was gradually improved.

(Study on Median Size)

Examples 35 Through 41

Coin-type batteries were formed as in the case of Example 1, except that the median size was variously changed. The results of evaluating the cycle characteristics of the coin-type batteries are shown in Table 6. When the median size was too large or too small, a decline in the capacity retention ratio was observed.

(Formation by Atomization Method)

Examples 42 and 43

Coin-type batteries were formed as in the case of Example 1, except that the alloy material was formed by an atomization method.

Comparative Examples 10 and 11

Coin-type batteries were formed as in the case of Example 1, except that an anode active material including no element R was formed by the atomization method.

The results of evaluating the cycle characteristics of the coin-type batteries are shown in Table 7. It was found out that even in the case where the anode active material was formed by the atomization method, low crystallization by adding the element R was effective.

In each example, the coin-type battery comprising lithium metal as the counter electrode was used to verify the effects of the invention; however, the same effects could be verified with a cylindrical battery.

TABLE 1

| | COMPOSITION | SPECIFIC SURFACE AREA $m^2/g$ | HALF-WIDTH ° | MEDIAN SIZE μm | RETENTION RATIO % |
|---|---|---|---|---|---|
| EXAMPLE 1 | 32Cu48Sn20B | 1.2 | 5 | 10 | 88 |
| COMPARATIVE EXAMPLE 1 | 40Cu60Sn | 0.6 | 0.3 | 10 | 40 |
| EXAMPLE 2 | 32Fe48Sn20B | 1.5 | 5 | 10 | 89 |
| COMPARATIVE EXAMPLE 2 | 40Fe60Sn | 0.6 | 0.3 | 10 | 42 |
| EXAMPLE 3 | 32Co48Sn20B | 1.5 | 5 | 10 | 89 |
| COMPARATIVE EXAMPLE 3 | 40Co60Sn | 0.6 | 0.3 | 10 | 46 |
| EXAMPLE 4 | 32Zn48Sn20B | 1.5 | 5 | 10 | 87 |
| COMPARATIVE EXAMPLE 4 | 40Zn60Sn | 0.6 | 0.3 | 10 | 40 |
| EXAMPLE 5 | 32Ni48Sn20B | 1.5 | 5 | 10 | 86 |
| COMPARATIVE EXAMPLE 5 | 40Ni60Sn | 0.6 | 0.3 | 10 | 41 |
| EXAMPLE 6 | 32Mn48Sn20B | 1.5 | 5 | 10 | 88 |
| COMPARATIVE EXAMPLE 6 | 40Mn60Sn | 0.6 | 0.3 | 10 | 48 |
| EXAMPLE 7 | 32Ag48Sn20B | 1.5 | 5 | 10 | 86 |
| COMPARATIVE EXAMPLE 7 | 40Ag60Sn | 0.6 | 0.3 | 10 | 43 |
| EXAMPLE 8 | 32In48Sn20B | 1.5 | 5 | 10 | 85 |
| COMPARATIVE EXAMPLE 8 | 40In60Sn | 0.6 | 0.3 | 10 | 41 |

TABLE 2

| | COMPOSITION | SPECIFIC SURFACE AREA $m^2/g$ | HALF-WIDTH ° | MEDIAN SIZE μm | RETENTION RATIO % |
|---|---|---|---|---|---|
| EXAMPLE 9 | 32Fe48Sn20B | 70 | 10 | 0.1 | 80 |
| COMPARATIVE EXAMPLE 9 | 32Fe48Sn20B | 80 | 10 | 0.1 | 60 |

TABLE 3

| | COMPOSITION | SPECIFIC SURFACE AREA m²/g | HALF-WIDTH ° | MEDIAN SIZE μm | RETENTION RATIO % |
|---|---|---|---|---|---|
| EXAMPLE 10 | 32Fe48Sn20C | 1.5 | 5 | 10 | 87 |
| EXAMPLE 11 | 32Fe48Sn20Al | 1.5 | 5 | 10 | 89 |
| EXAMPLE 12 | 32Fe48Sn20Si | 1.6 | 5 | 10 | 86 |
| EXAMPLE 13 | 32Fe48Sn20P | 1.5 | 5 | 10 | 87 |
| EXAMPLE 14 | 32Fe48Sn20S | 1.5 | 5 | 10 | 86 |
| EXAMPLE 15 | 32Co48Sn20C | 1.5 | 5 | 5 | 86 |
| EXAMPLE 16 | 32Co48Sn20Al | 1.5 | 5 | 5 | 85 |
| EXAMPLE 17 | 32Co48Sn20Si | 1.5 | 5 | 5 | 84 |
| EXAMPLE 18 | 32Co48Sn20P | 1.5 | 5 | 5 | 85 |
| EXAMPLE 19 | 32Co48Sn20S | 1.5 | 5 | 5 | 88 |
| EXAMPLE 20 | 30Fe53Sn6In11C | 1.5 | 5 | 2 | 91 |
| EXAMPLE 21 | 30Co53Sn6In11C | 1.5 | 5 | 2 | 90 |
| EXAMPLE 22 | 29Fe52Sn5In5Zn10C | 1.5 | 5 | 2 | 92 |
| EXAMPLE 23 | 29Fe52Sn5In5Zn10C | 1.5 | 5 | 2 | 91 |

TABLE 4

| | COMPOSITION | SPECIFIC SURFACE AREA m²/g | HALF-WIDTH ° | MEDIAN SIZE μm | RETENTION RATIO % |
|---|---|---|---|---|---|
| EXAMPLE 24 | 18Fe27Sn55C | 2.0 | 5 | 10 | 65 |
| EXAMPLE 25 | 20Fe30Sn50C | 1.6 | 5 | 10 | 82 |
| EXAMPLE 26 | 28Fe42Sn30C | 1.5 | 5 | 10 | 86 |
| EXAMPLE 27 | 36Fe54Sn10C | 1.5 | 5 | 10 | 87 |
| EXAMPLE 28 | 36Fe54Sn10C | 1.5 | 5 | 10 | 88 |
| EXAMPLE 29 | 40Fe59.99Sn0.01C | 1.2 | 5 | 10 | 60 |

TABLE 5

| | COMPOSITION | SPECIFIC SURFACE AREA m²/g | HALF-WIDTH ° | MEDIAN SIZE μm | RETENTION RATIO % |
|---|---|---|---|---|---|
| EXAMPLE 30 | 36Fe54Sn10C | 2.0 | 0.5 | 2 | 80 |
| EXAMPLE 31 | 36Fe54Sn10C | 2.0 | 1 | 2 | 85 |
| EXAMPLE 32 | 36Fe54Sn10C | 2.0 | 5 | 2 | 90 |
| EXAMPLE 33 | 36Fe54Sn10C | 10 | 25 | 0.1 | 94 |
| EXAMPLE 34 | 36Fe54Sn10C | 60 | — | 0.1 | 97 |

TABLE 6

| | COMPOSITION | SPECIFIC SURFACE AREA m²/g | HALF-WIDTH ° | MEDIAN SIZE μm | RETENTION RATIO % |
|---|---|---|---|---|---|
| EXAMPLE 35 | 36Fe54Sn10C | 2.0 | 5 | 0.08 | 70 |
| EXAMPLE 36 | 36Fe54Sn10C | 2.0 | 5 | 0.1 | 86 |
| EXAMPLE 37 | 36Fe54Sn10C | 2.0 | 5 | 0.5 | 85 |
| EXAMPLE 38 | 36Fe54Sn10C | 1.2 | 5 | 30 | 84 |
| EXAMPLE 39 | 36Fe54Sn10C | 1.2 | 5 | 40 | 81 |
| EXAMPLE 40 | 36Fe54Sn10C | 1.2 | 5 | 50 | 80 |
| EXAMPLE 41 | 36Fe54Sn10C | 1.2 | 5 | 60 | 64 |

TABLE 7

| | COMPOSITION | SPECIFIC SURFACE AREA $m^2/g$ | HALF-WIDTH ° | MEDIAN SIZE μm | RETENTION RATIO % |
|---|---|---|---|---|---|
| EXAMPLE 42 | 36Fe54Sn10C | 2.0 | 5 | 1 | 89 |
| EXAMPLE 43 | 36Cu54Sn10C | 2.0 | 5 | 1 | 88 |
| COMPARATIVE EXAMPLE 10 | 40Fe60Sn | 0.6 | 0.3 | 1 | 40 |
| COMPARATIVE EXAMPLE 11 | 40Cu60Sn | 0.6 | 0.3 | 1 | 38 |

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An anode active material comprising:
an alloy material including an element M capable of being alloyed with lithium selected from metal elements and metalloid elements and at least one kind of element R selected from elements with an atomic number of 20 or less, except for hydrogen, lithium and a noble gas, wherein
as the element M, tin and at least one kind selected from the group consisting of nickel, copper, iron, cobalt, manganese, zinc, indium and silver are included,
the content of the element R ranges from about 10 wt % to about 50 wt %;
the alloy material has a median particle size of about 50 μm or less,
the alloy material includes a reactive phase with lithium, and
a half-width of a diffraction peak obtained by X-ray diffraction analysis of the reactive phase is about 5° or more.

2. An anode active material according to claim 1, wherein as the element R, at least one kind selected from the group consisting of boron, carbon, aluminum, silicon, phosphorus and sulfur is included.

3. An anode active material according to claim 1, wherein the specific surface area ranges from about 1.0 $m^2/g$ to about 70 $m^2/g$.

4. An anode active material according to claim 1, wherein the median size is about 0.1 μm to about 50 μm.

5. A nonaqueous electrolyte secondary battery, comprising:
a cathode;
an anode; and
a nonaqueous electrolyte,
wherein the anode includes an alloy material including an element M capable of being alloyed with lithium selected from metal elements and metalloid elements and at least one kind of element R selected from elements with an atomic number of 20 or less except for hydrogen, lithium and a noble gas, wherein
the alloy material includes tin and at least one kind selected from the group consisting of nickel, copper, iron, cobalt, manganese, zinc, indium and silver as the element M,
the alloy material has a median particle size of about 50 μm or less,
a content of the element R in the alloy material ranges from about 10 wt % to about 50 wt %,
the alloy material includes a reactive phase with lithium, and
the half-width of a diffraction peak obtained by X-ray diffraction analysis of the reactive phase is about 5° or more.

6. An nonaqueous electrolyte secondary battery according to claim 5, wherein
the alloy material includes at least one kind selected from the group consisting of boron, carbon, aluminum, silicon, phosphorus and sulfur.

7. A nonaqueous electrolyte secondary battery according to claim 5, wherein
in the alloy material, a specific surface area ranges from about 1.0 $m^2/g$ to about 70 $m^2/g$.

8. An anode active material according to claim 5, wherein the median size is about 0.1 μm to about 50 μm.

* * * * *